Dec. 29, 1931. L. BLACKMORE 1,838,901
PISTON PIN RETAINER
Filed June 24, 1929
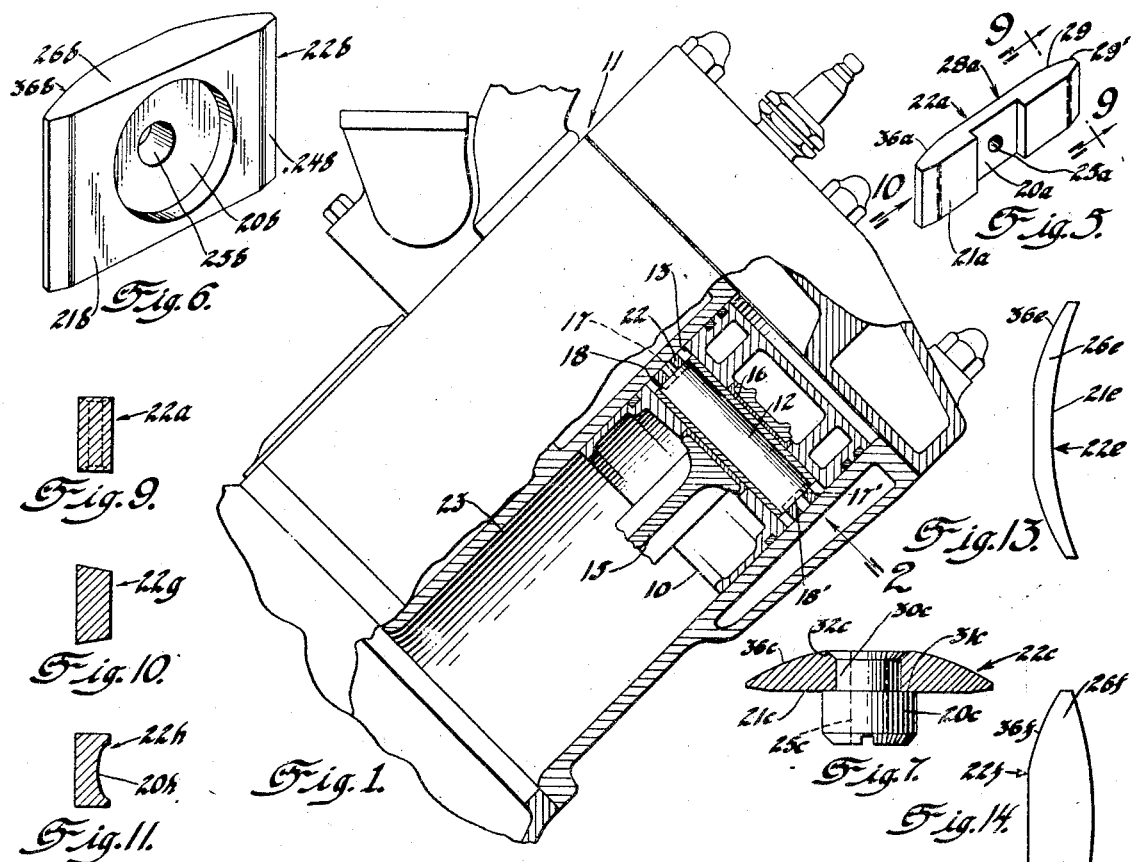
Inventor
Lloyd Blackmore Patented Dec. 29, 1931

1,838,901

UNITED STATES PATENT OFFICE

LLOYD BLACKMORE, OF DETROIT, MICHIGAN, ASSIGNOR TO GENERAL MOTORS CORPORATION, OF DETROIT, MICHIGAN, A CORPORATION OF DELAWARE

PISTON PIN RETAINER

Application filed June 24, 1929. Serial No. 373,195.

Although the present invention is referred to as a pin retainer, it should be understood that the invention contemplates specific cooperative relationships between novel retainers and adjacent parts,—such as tangentially or otherwise slotted pistons provided with usual or special transverse pins for the attachment of connecting rods; and that this invention aims at a simple and durable construction of mentioned parts which is entirely suitable for use in the internal combustion engines of automotive vehicles and the like,—said construction preferably relying upon an interfitting of "floating" parts to maintain the requisite elements in their intended relationships.

It is an object of this invention, providing each piston with bored or other bearings to receive a solid or hollow pin, and providing transverse and longitudinally-diminishing slots or depressions opposite the respective ends of said pin, to employ, in said depression, segmental retainers which are held or capable of but limited movement in said depressions,—although permitting rotation of the piston pin within said bearings; and, in preferred embodiments of this invention, said retainers, whether equal or unequal in breadth to the said pin, may be adapted snugly to fit between parallel or slightly convergent side walls of the mentioned depressions and/or exteriorly to conform, in curvature, with the piston on which they are employed; and they are adapted freely to receive or freely to project into an end of the piston pin until removed, by a chisel or punch.

Other objects of this invention, in some forms of which a plurality of the indicated interfitting relationships may be provided for, and in all forms of which said pin and/or said retainer may be permitted to float longitudinally only to an extent permitted by mutually engageable parts thereof, may be best appreciated from the following description of various alternative forms of retainers, adapted to enter corresponding slots in pistons, taken in connection with the appended claims and the accompanying drawings.

Figure 1 is a partial elevational view of an engine, which happens to be of V type, with parts so broken away as to show the general relationships in which embodiments of this invention are intended to be employed,—movable interior parts being arbitrarily displayed as if so turned as to dispose the axis of a piston pin at right angles to its normal position of use.

Figure 2 is an enlarged elevational view, taken from the general direction suggested by the arrow 2 of Figure 1, but showing only a portion of an engine piston,—this piston being provided with peripherally-diminishing slots adapting it to be used in conjunction with advantageous forms of pin retainer falling within the scope of the present invention.

Figures 3 and 12 are respectively partial transverse sectional views in which are shown two different types of retainers,—these being capable of either separate or conjoint use.

Figures 4 and 8 are respectively perspective views showing details of two retainers,—which may be identical in type with those shown respectively in Figures 3 and 12.

Figure 5 is a perspective view of a retainer which may be regarded as a primitive, crude or partial embodiment of the invention; and Figure 6 similarly shows a retainer differing only in height from that shown in Figure 4.

Figure 7 is a transverse sectional view, showing a retainer as formed from two parts permanently secured together by a threaded and/or "riveted" connection.

Figures 9, 10 and 11 are respectively sectional detail views; and

Figures 13 and 14 are respectively plan views of alternative types of retainer bodies hereinafter referred to.

Referring to details shown in Figures 1–4, inclusive, 10 being one of the pistons of an engine 11, cylindrical pin 12 is shown as extending through a bore 13 therein and also through an inner end 14 of a connecting rod 15,—a bearing shim 16, immaterial to the present invention, being shown as interposed.

In order to retain the pin 12, or its equivalent, while permitting it to "float" within bearings such as those provided by the mentioned bore 13, and to obviate all use of threads, wedges or clamping devices of any sort, the piston 10 is shown as provided with substantially parallel and longitudinally-diminishing depressions or slots 17, 17'. The bottoms of these slots may ordinarily be flat surfaces; and their lateral walls may be inwardly slightly converged or substantially parallel. Apparently nothing could ordinarily be gained by disposing them otherwise than at right angles both to the axis of the pin 12 and to those straight line elements of the cylindrical surface of piston 10 which extend at right angles to said axis; and they may advantageously be cut to such a depth as to provide for an appreciable protrusion of the respective ends 18, 18' of the pin 12, or its equivalent, in such manner as to prevent or limit longitudinal movement of any retainers disposed therein.

Within the respective depressions 17, 17', are employed one form or another of those special retainers to whose protection the present application, in one of its aspects, is particularly directed. As implied by the configuration of the depression 17 shown in Figure 2, these retainers 22, etc., may be rectangular in elevational outline, and may be of less "height" than the diameter of a pin 12; 21, etc. an inner face of a retainer of the type here referred to, may be centrally cut away or "relieved" as at 20, in such manner as to interfit with and/or to be limited in longitudinal movement by engagement with the exterior surface of one end of the pin 12.

The described construction will be seen to provide what may be a floating retainer for a floating pin,—the retainer being optionally kept in place by its interfitting relationship to mentioned parts and/or to the interior wall of any cylinder 23 within which the piston may be reciprocated.

To facilitate removal, whether or not given a wedging or drive fit by prying, the inner surface of the described retainer may be slightly beveled at one or both ends 24, 24', or otherwise provided with a tool-engageable depression or surface; and/or one or both of a pair of retainers may be provided with a central opening 25 (suitable for the insertion of a lifting tool or for the insertion of a longer tool to drive the opposite retainer from its position of use and/or) to facilitate lubrication,—a slightly depressed surface being optionally provided thereabout. Side surfaces 26 and 27 may be substantially flat and adapted snugly to interfit with surfaces 26', 27' of slots 17, 17'.

In the cheaply made form shown in Figure 5, the inner surface 21a of a retainer 22a is shown as provided with a substantially rectangular relieved area 20a, adapted to receive and to limit its longitudinal play relatively to (as well as to limit the longitudinal play of) any pin 12 with which it may be used. Optional and very limited "flats" being suggested at 28, in Figures 3 and 4, Figure 5 suggests an extensive flat surface 28a,—as if the entire unit were formed from bar stock so cut as to provide but a limited number of line element parallel contacts with cylinder 11 (as at 29, 29') and/or but a very limited cylindrical surface contact.

The form shown in Figure 6 will be seen to differ from that of the preceding figures mainly in that the "height" of the retainer 22b exceeds the diameter of a relieved area in the form of a bore 20b, adapted to receive one end of a pin 12; and in Figure 7 the inter-fitting part 20c of the retainer 22c is shown as having the form of a cylindrical boss adapted loosely to enter a hollow pin 12. This boss, if provided, may be integral with a reduced portion 30c terminating in a flat shoulder 31c, maintained in engagement with a relieved or unrelieved inner surface 21c of the retainer. In the form 22d shown in Figures 8 and 12, whether or not the pin-entering boss 20d' is integral with the body of the retainer, an externally but loosely interfitting relieved area 20d may concentrically surround a boss 20d', adapted rather loosely to enter a hollow pin 12.

It being a primary object of this invention to obviate risk of scoring cylinder walls, the shank 30c, and corresponding parts that may be employed in the form shown in Figures 8 and 12, may be too short to permit the detrimental action referred to; and, whether or not this shank is hollow and whether or not it is provided with external threads, it may be so headed down within a "countersunk" or other concavity 32c, as by a rivet-setting or swaging operation, as entirely to obviate risk of separation.

The retainers 22, 22a and 22b, as shown in Figures 4, 5 and 6, obviously may also be used with solid and floating pins; but the forms 22c and 22d, by reason of their inclusion of parts which are adapted to enter either snugly or loosely into pins, will be understood to presuppose the use of hollow pins or pin ends; and it is of incidental interest to note that, depending upon considerations of economy in manufacture and durability in use, the mentioned inter-fitting parts may be so accurately made and so correspond in radius of curvature as to adapt the so-called retainers to serve alternatively or additionally for any desired bearing effect. However, for ordinary purposes one of the mentioned comparatively simple forms shown may be preferred; and the clearances between relatively moving surfaces may be sufficient to obviate the necessity for precise centering in the perfecting of surfaces such as are provided at 20, 20a, 20b, 20c, 20d and/or 20d'. The provision of tool-receiving or lubricant holes such as are shown at 25 (25a, etc.), whether as an incident to casting or by subsequent operations, may be regarded as entirely optional; and it will be understood that any two retainers employed as a pair, opposite the respective ends of a pin 12, may ordinarily be alike in type and weight.

Outlines of a few alternative types of retainer bodies, as the same might appear upon a sectioning of the various forms herein referred to in a plane such as that suggested at 9—9, Figure 5, are diagrammatically shown in Figures 9, 10 and 11,—deemed to be taken from the direction indicated by an arrow 10; and it will be obvious that, although at least one of such retainers as are here referred to might be longitudinally slid into position between substantially parallel walls 26', 27', these retainers, like those mentioned in preceding and succeeding figures, may be directly inserted by an inward movement in the direction of the axis of the pin 12, incidentally to the assembly of the piston within a corresponding cylinder.

Figures 13 and 14 are added primarily to supplement Figures 9, 10 and 11 in emphasizing the fact that, depending upon such considerations as the thickness of the walls of pistons in which are formed peripherally-diminishing depressions for the reception of retainers, the inner surfaces of any of the retainers may be either flat or concave or convex and curved in either a longitudinal or transverse direction, or in both. The inner surface 21e of the retainer 22e being shown in Figure 13 as concave, the corresponding surface 21f of the retainer 22f is shown as convex; and these inner surfaces may or may not be provided with inter-fitting areas or parts as disclosed in, for example, Figure 8; but it will be understood that, in any case, the length of any pin 12 used therewith is intended to be such as to adapt its ends to a rotative movement relatively to said surfaces. The radius of cylindrical curvature of any external curved surfaces 36 (36a, etc.) provided on the respective retainers may substantially correspond with, even if slightly less than, that of the cylindrical surface 37 of the piston upon which such retainers are employed; the positionng of the retainers may or may not involve a wedge or drive fit between lateral surfaces 26, 27 (26a, 27a, etc.) of the retainer, and the cooperating surfaces 26', 27',—a wedge fit being suggested, with exaggeration, in the case of the retainer 22g, Figure 10; but, in the usual case, the external surfaces of retainers may well be of such configuration as "automatically" to keep the retainers in position so long as a piston 10 remains within the cooperating cylinder 23,— disengagement thus optionally requiring merely the removal of the piston from the cylinder.

A primary function of the described retainers being the limitation of longitudinal movement of a pin such as the rod-connecting "wrist pin" 12 of an engine piston 10 in such manner that both the pin and the retainer used therewith may be said to "float", in the sense above indicated, in order to obviate need for great accuracy in producing retainers, sufficient play may ordinarily be permitted to or within each retainer either to allow the corresponding end of a pin (interfitting therewith but preferably free both to slide longitudinally and to rotate relatively thereto) to determine the exact position thereof in the corresponding slot or depression 17, 17' or to allow the end of the pin to assume a slightly eccentric position with reference to any relieved area 20 (or 20a, etc.) and/or with reference to any pin-entering boss 20c, or the like. As suggested, an exterior retainer providing a plurality of line contacts may herein be regarded as the functional equivalent of a cylindrical surface or surfaces 36 (36a, etc.); and even though liberal clearance be elsewhere provided for, it is ordinarily preferable that side surfaces 26, 27, or the like, shall accurately interfit between the corresponding walls 26', 27' of the slot 17. The bodies of any of the described retainers may be cast, or drop-forged, or they may be cut from either substantially rectangular or parti-cylindrical stock,—in preference to stamping them from sheet metal, or the like.

Although, in order to emphasize the principles relied upon, the foregoing description has included disclosures of a liberal number of alternative forms, it should be understood not only that various features of this invention might be independently used, but also that numerous additional modifications might easily be devised,—all within the spirit and scope of the present invention.

I claim:

1. In combination: a piston provided with a rod-connecting pin and with a longitudinally-diminishing slot opposite an end of said pin; and a segmental retainer, substantially rectangular in elevational outline, which is adapted to interfit between lateral walls of said slot and which is provided with an inner face so shaped as to limit longitudinal movement of said pin while permitting free rotation thereof,—an inner face of said retainer being provided with a part adapted internally to engage said pin being provided with a depression to receive an adjacent pin end and to so engage said pin as to permit relative rotation thereof and also lock the retainer against longitudinal displacement in its slot.

2. In combination: a piston provided with a rod-connecting pin and with a longitudinally-diminishing slot opposite an end of said pin; and a segmental retainer, substantially rectangular in elevational outline, which is adapted to interfit between lateral walls of said slot and which is provided with an inner face so shaped as to limit longitudinal movement of said pin while permitting free rotation thereof,—one of the mentioned elements being shaped for a prying engagement by a removing chisel.

3. For use in limiting the longitudinal play of a bearing pin within a piston: a pin retainer which exteriorly conforms to the curvature of said piston and which is laterally provided with flat faces adapting it to be longitudinally slid and held between corresponding walls of a slot in said piston,—the inner face of said retainer being shaped to interfit with a cylindrical surface of said pin while permitting rotation thereof.

4. For use in limiting the longitudinal play of a bearing pin within a piston: a pin retainer which exteriorly conforms to the curvature of said piston and which is laterally provided with flat faces adapting it to be held between corresponding walls of a slot in said piston,—an inner face thereof being provided with a relieved area adapted freely to receive an end of said pin and to permit rotation thereof.

5. For use in limiting the longitudinal play of a bearing pin within a piston: a pin retainer which exteriorly conforms to the curvature of said piston and which is laterally provided with flat faces adapting it to be held between corresponding walls of a slot in said piston,—an inner face being substantially flat but provided with a tool-engageable surface which is depressed relatively to a mentioned face.

6. In combination: a piston; a wrist pin therein; and a retainer extending transversely at an end of said pin and having a depression in its inner face which receives the adjacent end of the pin and so interfits therewith that each limits the longitudinal play of the other while permitting relative rotation.

In testimony whereof I affix my signature.

LLOYD BLACKMORE.